United States Patent
Lee (10) Patent No.: US 10,180,499 B2
(45) Date of Patent: Jan. 15, 2019

(54) LOCATION INFORMATION SYSTEM, USING VEHICLE AND SMART DEVICE AND METHOD OF CONTROLLING THE SAME

(71) Applicant: Hyundai Motor Company, Seoul (KR)

(72) Inventor: Seung Cheol Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 112 days.

(21) Appl. No.: 15/372,559

(22) Filed: Dec. 8, 2016

(65) Prior Publication Data

US 2017/0168164 A1   Jun. 15, 2017

(30) Foreign Application Priority Data

Dec. 9, 2015   (KR) .......................... 10-2015-0174646

(51) Int. Cl.
   *G01S 19/31* (2010.01)
   *H04W 4/02* (2018.01)

(52) U.S. Cl.
   CPC ............. *G01S 19/31* (2013.01); *H04W 4/025* (2013.01); *H04W 4/027* (2013.01); *G01S 2205/008* (2013.01)

(58) Field of Classification Search
   CPC ...................................................... G01S 19/31
   See application file for complete search history.

(56) References Cited

U.S. PATENT DOCUMENTS

| | | | |
|---|---|---|---|
| 8,589,015 B2* | 11/2013 | Willis | G01C 21/165 701/1 |
| 9,250,083 B2* | 2/2016 | Czompo | G01C 21/165 |
| 9,752,879 B2* | 9/2017 | Al-Hamad | G01C 21/16 |
| 2011/0238307 A1* | 9/2011 | Psiaki | G01C 21/28 701/469 |

(Continued)

FOREIGN PATENT DOCUMENTS

| | | |
|---|---|---|
| JP | 2013-134700 A | 7/2013 |
| KR | 10-0793003 B | 6/2007 |

(Continued)

OTHER PUBLICATIONS

Korean Office Action issued in application 10-2015-0174646, dated Sep. 30, 2016.

*Primary Examiner* — Hussein Elchanti
*Assistant Examiner* — Michael A Berns
(74) *Attorney, Agent, or Firm* — Mintz Levin Cohn Ferris Glovsky and Popeo, P.C.; Peter F. Corless (57) ABSTRACT

A method of controlling a location information system in a vehicle includes: establishing a communication path between a control unit equipped in the vehicle and a smart device; acquiring, by the control unit of the vehicle, first data including a first heading value and first location information; transmitting, by the control unit of the vehicle, the measured first data to the smart device; receiving, at the smart device, the first data from the control unit of the vehicle via the communication path; acquiring, by the smart device, second data including a second heading value and second location (Continued)

information; comparing, by the smart device, the first data with the second data; and updating, by the smart device, information of a navigation function of the smart device based on the first data or the second data depending on the comparing of the first data with the second data.

18 Claims, 5 Drawing Sheets

(56) References Cited

U.S. PATENT DOCUMENTS

| | | |
|---|---|---|
| 2013/0316310 A1 | 11/2013 | Musicant et al. |
| 2014/0005928 A1 | 1/2014 | Giannetta et al. |
| 2017/0168164 A1* | 6/2017 | Lee .......................... G01S 19/31 |

FOREIGN PATENT DOCUMENTS

| | | |
|---|---|---|
| KR | 10-2008-0063677 A | 7/2008 |
| KR | 10-2009-0093631 A | 9/2009 |
| KR | 10-2011-0131781 A | 12/2011 |
| KR | 10-2012-0095552 A | 8/2012 |
| KR | 10-2013-0011351 A | 1/2013 |
| KR | 10-2013-0112916 | 10/2013 |
| KR | 10-2015-0065783 A | 6/2015 |
| KR | 10-2015-0091392 | 8/2015 |

\* cited by examiner

LOCATION INFORMATION SYSTEM, USING VEHICLE AND SMART DEVICE AND METHOD OF CONTROLLING THE SAME

CROSS-REFERENCE TO RELATED APPLICATION

This application claims the benefit of and priority to Korean Patent Application No. 10-2015-0174646, filed on Dec. 9, 2015, which is hereby incorporated by reference as if fully set forth herein.

BACKGROUND OF THE DISCLOSURE

Technical Field

The present disclosure relates generally to a location information system and a method of controlling the same and, more particularly, to a location information system that acquires corrected information about a current position and heading of a vehicle when a navigation function of a smart device is used in the vehicle.

Discussion of the Related Art

Interconnection technology between smart devices such as smartphones and vehicles has increased as use of smart devices has become more widespread. To this end, standardization organizations and mobile providers are proposing various technologies. Examples of such standard technology can include "MirrorLink" which is standardized through the Car Connectivity Consortium (CCC), "Apple CarPlay" of Apple, and "Android Auto" of Google. Data exchange according to such technologies will now be described with reference to FIG. 1.

Figure 1:
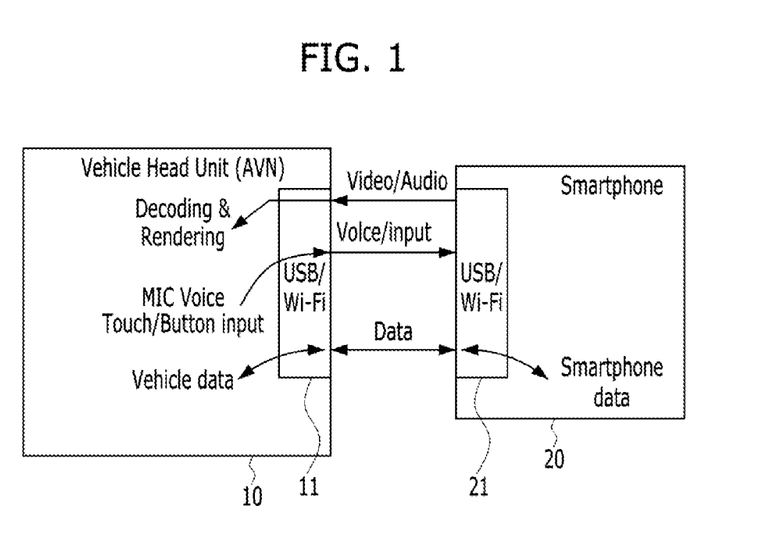
FIG. 1 illustrates an example of data exchange through links between a vehicle and a smartphone.

FIG. 1 illustrates an example of data exchange through link between a vehicle and a smartphone.

As shown in FIG. 1, a communication module 11 of a vehicle head unit terminal 10 can perform data exchange through a link to a communication module 21 of a smartphone 20 in a wired/wireless manner (e.g., universal serial bus (USB) or Wi-Fi). Specifically, the smartphone 20 creates video and audio information, streams the created information to the vehicle, decodes streams received from the vehicle head unit terminal 10, displays images through a display such as an LCD, and outputs sound through a sound system set in the vehicle. In addition, information of the vehicle and the smartphone may be exchanged through a data channel.

Since such vehicle and smartphone interconnection technology can make up for the weakness of vehicle IT by integrating rapidly improved smartphone technology into the automobile industry with relatively slow technological innovation, many vehicle manufacturers are expected to apply the interconnection technology to mass production for the foreseeable future. For example, a navigation application can rely on interconnection standard technology between a vehicle and the smartphone. In this regard, it is important for the navigation application to acquire correct location information for correct navigation operation.

A smartphone includes a sensor and an algorithm for estimating correct location information by combining location information acquired through a global positioning system (GPS), Wi-Fi, a mobile network and the like. However, when the smartphone operates in a vehicle, it may be difficult to acquire location information through a GPS module and Wi-Fi. Accordingly, technical standards propose schemes for transmitting location information acquired through a high-performance GPS module built in a vehicle to a smartphone such that the smartphone estimates current location on the basis of the location information. However, since a GPS module built in a vehicle is relatively expensive and requires a separate antenna, housing, high-performance coaxial cable and the like, a vehicle that is not provided with an embedded navigation system of a vehicle manufacturer is not equipped with the GPS module in general.

Accordingly, if location information is acquired using only a GPS module of a smartphone inside of such vehicle, it is difficult to track information about a direction in which the vehicle current travels at a low speed, i.e., heading information. Heading information is typically acquired by comparing GPS coordinates measured at two or more different times and can refer to a direction of the next coordinate on the basis of the previous coordinates. This is described with reference to FIGS. 2A and 2B.

Figure 2A:
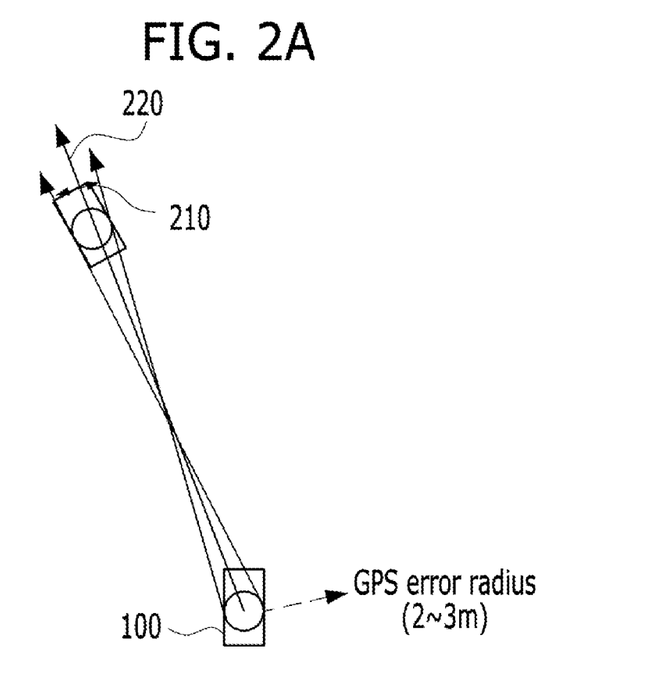
FIGS. 2A and 2B illustrate problems that may be generated when a normal smartphone acquires heading information of a vehicle when the vehicle travels at a low speed.
Figure 2B:
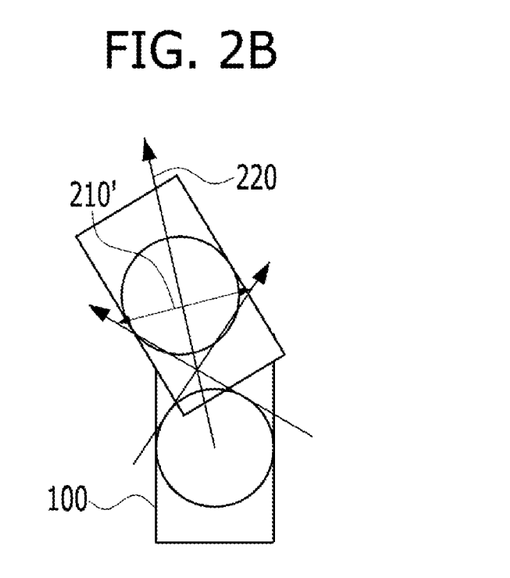

FIGS. 2A and 2B illustrate problems that may be generated when a normal smartphone acquires heading information when a vehicle travels at a low speed.

Generally, when location information is acquired using a GPS module of a conventional smartphone in the vehicle 100, the location information error amounts to a 2 to 3-meter radius. When the location error sensed through the GPS module is generated in front of or behind the vehicle 100, the error can be considered to hardly affect the heading information. However, if the location error is generated at the sides of the vehicle, a large error may be generated in the heading information, particularly when the vehicle travels at a low speed.

For example, when the vehicle travels at a high speed, as shown in FIG. 2A, if the location of the vehicle 100 leaning to one side within an error radius is sensed before the vehicle moves, and location of the vehicle leaning to the other side within the error radium is sensed after moving, there is little difference between a heading error range 219 and actual heading 220. However, when the vehicle 100 travels at a low speed, as shown in FIG. 2B, a maximum lateral error range 210' may considerably differ from the actual heading 200.

In addition, the reliability of smartphone location information decreases in a GPS shadow area even though the smartphone has components for locating a vehicle in the shadow area, such as a gyroscope. This is because it is difficult for the gyroscope, which operates under the condition that the smartphone is mounted at a predetermined angle, to estimate the correct location since the user places the smartphone inside the vehicle arbitrarily.

SUMMARY OF THE DISCLOSURE

An object of the present disclosure devised to solve the problem lies in a location information system capable of providing accurate location information and heading information when a navigation function of a smart device is used in a vehicle, and a method of controlling the same.

Another object of the present disclosure is to provide a location information system capable of providing accurate location information and heading information even in a GPS shadow area or even when a vehicle travels at a low speed.

Technical tasks obtainable from the present disclosure are not limited to the tasks mentioned above. In addition, other unmentioned technical tasks can be clearly understood from the following description by those having ordinary skill in the technical field to which the present disclosure pertains.

According to embodiments of the present disclosure, a method of controlling a location information system in a vehicle includes: establishing a communication path between a control unit equipped in the vehicle and a smart device; acquiring, by the control unit of the vehicle, first data including a first heading value and first location information; transmitting, by the control unit of the vehicle, the measured first data to the smart device; receiving, at the smart device, the first data from the control unit of the vehicle via the communication path; acquiring, by the smart device, second data including a second heading value and second location information; comparing, by the smart device, the first data with the second data; and updating, by the smart device, information of a navigation function of the smart device, including location information and a heading value, based on the first data or the second data depending on a result of the comparing of the first data with the second data.

Furthermore, according to embodiments of the present disclosure, a non-transitory computer readable medium storing a program for controlling a location information system in a vehicle includes: program instructions that establish a communication path between a control unit equipped in the vehicle and a smart device, wherein the control unit of the vehicle acquires first data including a first heading value and first location information and transmits the measured first data to the smart device; program instructions that receive the first data from the control unit of the vehicle via the communication path; program instructions that acquire second data including a second heading value and second location information; program instructions that compare the first data with the second data; and program instructions that update information of a navigation function of the smart device, including location information and a heading value, based on the first data or the second data depending on a result of the comparing of the first data with the second data.

Furthermore, according to embodiments of the present disclosure, a location information system includes: a vehicle having a control unit equipped therein that acquires first data including a first heading value and first location information and transmits the measured first data to the smart device; and a smart device that receives the first data via a communication path established between the smart device and the control unit of the vehicle, acquires second data including a second heading value and second location information, compares the first data with second data, and updates information of a navigation function of the smart device, including location information and a heading value, based on the first data or the second data depending on a result of the comparing of the first data with the second data.

Accordingly, it is possible to provide accurate location information and heading information by considering information acquired in order to estimate location and direction in a vehicle when a navigation function of a smart device is used in the vehicle. Particularly, more accurate location information and heading information can be provided since the reliability and speed of a GPS module of the smart device are considered.

The effects of the present disclosure are not limited to the above-described effects, and other effects which are not described herein will become apparent to those skilled in the art from the following description.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. The terms "module" and "unit" used to signify components are used herein to aid in understanding of the components and thus they should not be considered as having specific meanings or roles. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus, such as a vehicle and/or smart device, comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

In the following description of the present disclosure, a detailed description of known functions and configurations incorporated herein will be omitted when it may obscure the subject matter of the present disclosure. The accompanying drawings illustrate exemplary embodiments of the present disclosure and provide a more detailed description of the present disclosure. However, the scope of the present disclosure should not be limited thereto. It should be understood that there is no intent to limit the disclosure to the particular forms disclosed herein. On the contrary, the disclosure is to cover all modifications, equivalents, and alternatives falling within the spirit and scope of the disclosure as defined by the claims.

According to embodiments of the present disclosure, information for estimating current location and heading information of a vehicle is acquired through sensors included in the vehicle, transmitted to a smart device and combined with information acquired through a GPS module of the smart device such that the smart device obtains more accurate location information heading information.

Furthermore, according to embodiments of the present disclosure, the information acquired through the sensors included in the vehicle may include at least one of a steering angle, acceleration and linear velocity information. Such information has high generality since the information can be acquired even in a vehicle that is not equipped with a GPS module. A description will be given of the principle of calculating heading information using a steering system of a vehicle with reference to FIG. 4.

Figure 3:
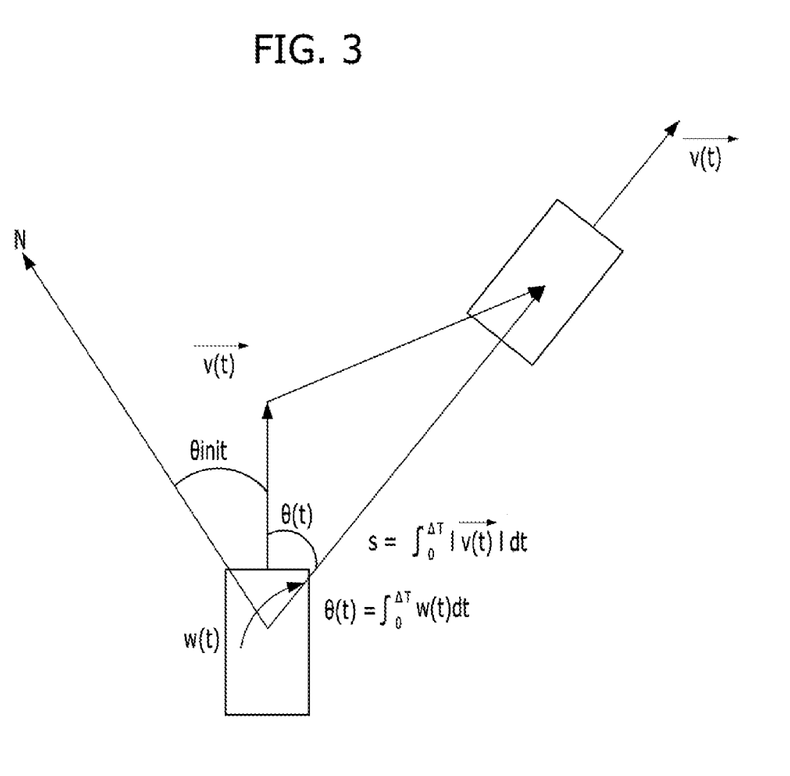
FIG. 3 illustrates a process of calculating heading information using a steering system in a vehicle according to embodiments of the present disclosure.

FIG. 3 illustrates a process of calculating heading information using a steering system in a vehicle according to embodiments of the present disclosure.

As shown in FIG. 3, when angular velocity at which a driver manipulates a steering wheel is w(t) and time delay is $\Delta T$, since the integral value of angular velocity means an angle variation, $\int_0^{\Delta T} w(t)dt$ indicates an angle variation after $\Delta T$. That is, the angle variation provides information on heading of the vehicle.

A heading value is defined as an angle of the time base with respect to true north. Accordingly, the heading value of the vehicle can be represented by $\theta(t)=\theta init+\int_0^{\Delta T} w(t)dt$ in FIG. 3. The heading value can be transmitted to the smart device as information about heading of the vehicle when the vehicle moves within a GPS error range at a low speed. At a high speed, the heading value is similar to that obtained through GPS. An initial heading value $\theta init$ is a heading value when the vehicle is parked and may be a value acquired from the smart device and stored before an AVN system is turned off after being parked.

The location of the vehicle can be obtained through the velocity vector $\overline{v(t)}$ the vehicle. Specifically, since the absolute value of a moving distance is represented by integral with respect to time, the moving distance s can be indicated by $s=\int_0^{\Delta T}|\overline{v(t)}|dt$. That is, the final location of the vehicle can be represented by Equation 1.

$$\int_0^{\Delta T}|\overline{v(t)}|dt \cdot e^{i(<\vec{v}+\int_0^{\Delta T} w(t)dt)} \qquad [\text{Equation 1}]$$

When the heading value and moving distance of the vehicle are obtained using the steering angle and velocity vector through the aforementioned method, current location information can be corrected through the smart device using information obtained through the vehicle even if the vehicle enters a shadow area and thus the GPS of the smart device has a difficulty in normal operation.

However, reliability of location/heading information obtained through the vehicle may differ due to varying degrees of reliability of location/heading information acquired through the GPS of the smart device, according to the particular situation. For example, if vehicle speed and/or GPS fix quality are high, information acquired through the GPS of the smart device can be applied to the navigation function and the smart device can feed back the information to the vehicle such that the vehicle updates the heading value or location information thereof. Conversely, when the vehicle speed and/or GPS fix quality are low, the smart device can update current heading/location information to heading/location information calculated through the vehicle. This process will be described in more detail with reference to FIG. 4.

Figure 4:
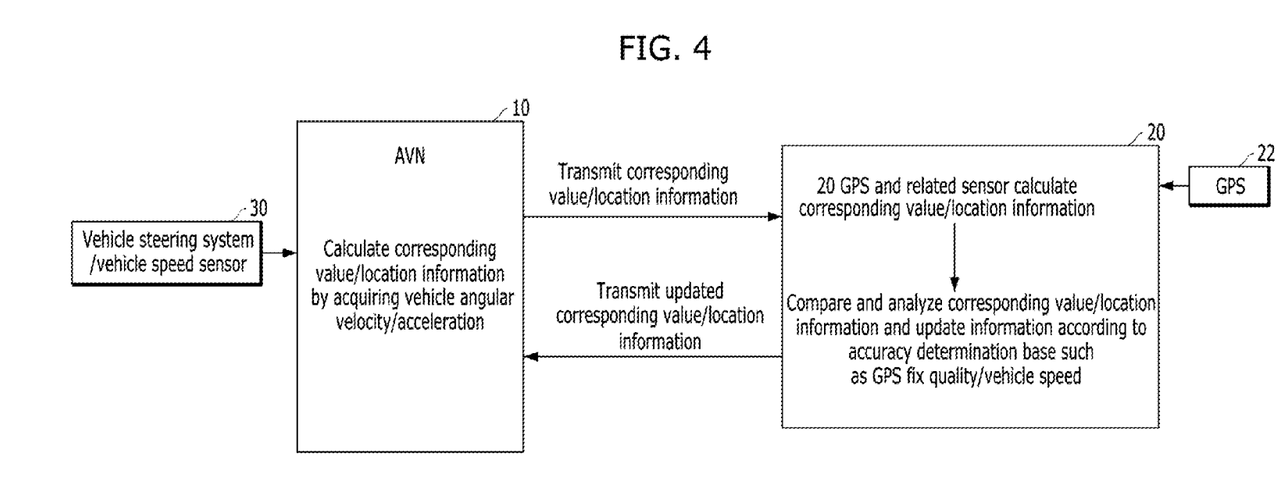
FIG. 4 illustrates an exemplary process of updating current location and heading information through information exchange between a vehicle and a smart device according to embodiments of the present disclosure.

FIG. 4 illustrates an exemplary process of updating current location and heading information through information exchange between a vehicle and a smart device according to embodiments of the present disclosure.

As shown in FIG. 4, an AVN system 10 of a vehicle may acquire steering angle information and speed information from a steering system/vehicle speed sensor 30 and calculate a heading value and location information. The calculated heading value and location information are transmitted to a smart device 20. It should be understood that the smart device 20 is inclusive of any mobile computing device, such as a mobile phone, tablet, smart watch, laptop, PDA, and the like.

The smart device 20 may compare a heading value and location information obtained thereby through a global positioning system (GPS) and related sensors (e.g., acceleration sensor, gyro sensor, etc.) with the heading value and location information received from the vehicle and determine a heading value and location information to be applied to the navigation function according to the comparison result. As described above, current vehicle speed and GPS fix quality are preferably considered in determination of whether the heading value and location information obtained through the vehicle or the heading value and location information acquired through the smart device are applied to the navigation function.

The determination result may be transmitted to the vehicle such that the vehicle updates the heading value and location information. The vehicle can calculate location and heading value variations using the updated values as initial values.

Figure 5:
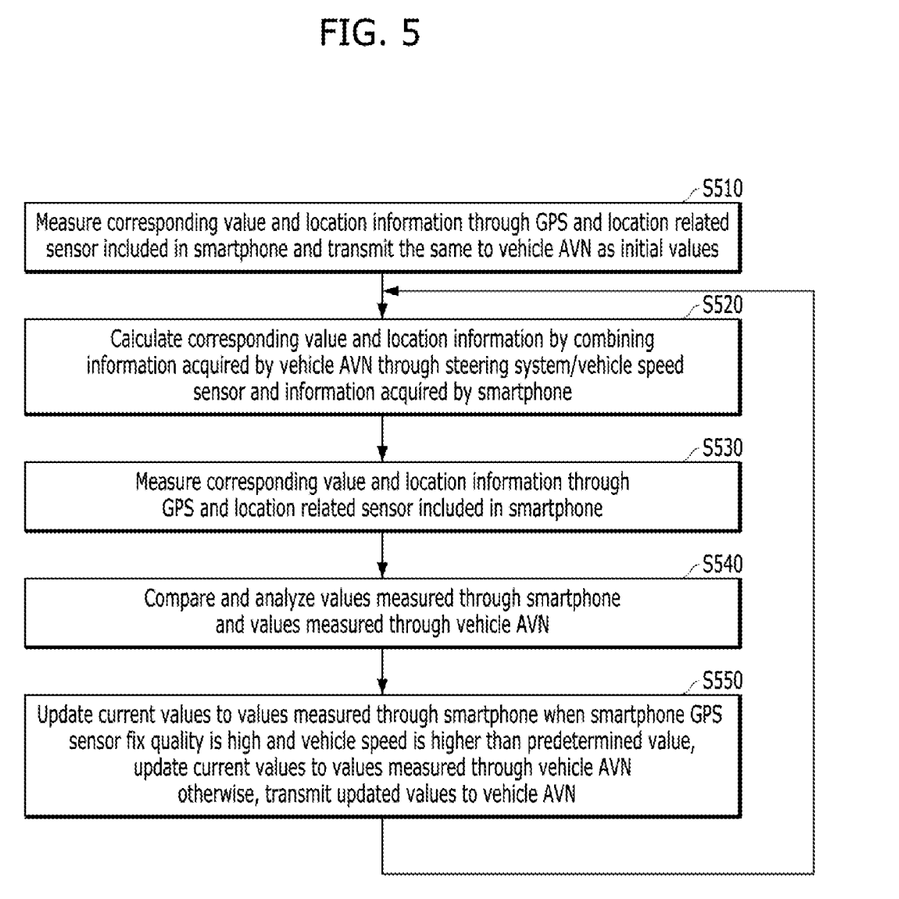
FIG. 5 is a flowchart illustrating the exemplary process of updating current location and heading information through information exchange between the vehicle and the smart device according to embodiments of the present disclosure.

The aforementioned operation performed between the smart device and the vehicle is shown as a flowchart in FIG. 5.

FIG. 5 is a flowchart illustrating the exemplary process of updating current location and heading information through information exchange between the vehicle and the smart device according to embodiments of the present disclosure. Here, it is assumed that the smart device and a control unit of an audio-video-navigation (AVN) system of the vehicle (or AVN system, for simplicity) secure a communication path for wired/wireless data exchange through a predetermined procedure.

As shown in FIG. 5, an initial heading value and initial location information are necessary for the AVN system of the vehicle to calculate a heading value and location information. Accordingly, a heading value and location information acquired by the smart device through the GPS and related sensors are transmitted to the AVN system (S501). However, this process may be omitted when a final heading value is received from the smart device and stored before vehicle driving has ended.

Then, the AVN system calculates a current heading value and location information using information obtained from the steering system/vehicle speed sensor on the basis of the heading value and location information acquired from the smart device and transmits the calculated current heading value and location information to the smart device (S520).

The smart device acquires current location information and a heading value through the GPS and related sensors thereof (S530). The smart device compares the current location information and heading value with the information received from the vehicle (S540). When GPS fix quality and/or vehicle speed are higher than predetermined reference values, information to be applied to the navigation function of the smart device (e.g., information for use within a navigation application installed on the smart device) is updated based on the information acquired by the smart device. When GPS fix quality and/or vehicle speed are lower than the predetermined reference values, on the other hand, information to be applied to the navigation function of the smart device is updated based on the information acquired by a control unit of vehicle (S550). The updated information is transmitted to the control unit of the vehicle such that the control unit of the vehicle uses the updated information as the basis to be combined with its own acquired navigation information.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of controlling a location information system including a vehicle with an audio-video-navigation (AVN) system, a steering system, and a vehicle speed sensor, and further including a smart device with a global positioning system (GPS) module, an acceleration sensor, and a gyro sensor, the method comprising:
   establishing, by a control unit of the AVN system of the vehicle, a communication path between the vehicle and the smart device;
   acquiring, by the steering system of the vehicle, angular velocity information of the vehicle;
   acquiring, by the vehicle speed sensor of the vehicle, acceleration information of the vehicle;
   calculating, by the control unit of the AVN system of the vehicle, first data including a first heading value and first location information based on the angular velocity information and the acceleration information;
   transmitting, by the control unit of the AVN system of the vehicle, the first data to the smart device;
   receiving, at the smart device, the first data from the control unit of the AVN system of the vehicle via the communication path;
   acquiring, by the GPS module, the acceleration sensor, and the gyro sensor of the smart device, second data including a second heading value and second location information;
   comparing, by the smart device, the first data with the second data; and
   updating, by the smart device, information of a navigation function of the smart device, including location information and a heading value, based on the first data or the second data depending on a result of the comparing of the first data with the second data.

2. The method according to claim 1, further comprising transmitting, by the smart device, the updated information to the control unit of the vehicle, wherein the control unit of the vehicle uses the updated information as a basis of measurement for a subsequent first data.

3. The method according to claim 1, further comprising transmitting, by the smart device, a final heading value to the control unit of the vehicle before driving of the vehicle has ended, wherein the control unit of the vehicle uses the final heading value as a basis of the first data measured during a subsequent driving of the vehicle.

4. The method according to claim 1, wherein the second data is measured using a global positioning system (GPS) module and at least one sensor of the smart device.

5. The method according to claim 4, wherein the at least one sensor includes at least one of an acceleration sensor and a gyro sensor.

6. The method according to claim 5, wherein the updating of the information is performed using the second data when the speed of the vehicle and the fix quality of the GPS module are higher than predetermined reference values.

7. The method according to claim 5, wherein the updating of the information is performed using the first data when the speed of the vehicle and the fix quality of the GPS module are lower than predetermined reference values.

8. The method according to claim 4, wherein the comparing of the first data with the second data is performed based on at least one of a speed of the vehicle and a fix quality of the GPS module.

9. The method according to claim 1, wherein the first data is acquired using angular velocity information acquired from a steering system of the vehicle and acceleration information acquired from a vehicle speed sensor of the vehicle.

10. A location information system, comprising:
   a vehicle having steering system configured to acquire angular velocity information of the vehicle, a vehicle speed sensor configured to acquire acceleration information of the vehicle, and an audio-video-navigation (AVN) system, wherein a control unit of the AVN system is configured to establish a communication path between the vehicle and a smart device, to calculate first data including a first heading value and first location information based on the angular velocity information and the acceleration information, and to transmit the first data to the smart device; and
   a smart device having a global positioning system (GPS) module, an acceleration sensor, and a gyro sensor, wherein the smart device is configured to receive the first data from the control unit of the AVN system via the communication path, to acquire second data including a second heading value and second location information using the GPS module, the acceleration sensor, and the gyro sensor, to compare the first data with the second data, and to update information of a navigation function of the smart device, including location information and a heading value, based on the first data or the second data depending on a result of the comparison of the first data with the second data.

11. The location information system according to claim 10, wherein the smart device transmits the updated information to the control unit of the vehicle, and the control unit of the vehicle uses the updated information as a basis of measurement for a subsequent first data.

12. The location information system according to claim 10, wherein the smart device transmits a final heading value to the control unit of the vehicle before driving of the vehicle has ended, and the control unit of the vehicle uses the final heading value as a basis of the first data measured during a subsequent driving of the vehicle.

13. The location information system according to claim 10, wherein the smart device measures the second data using a GPS module and at least one sensor of the smart device.

14. The location information system according to claim 13, wherein the at least one sensor includes at least one of an acceleration sensor and a gyro sensor.

15. The location information system according to claim 14, wherein the smart device performs the updating of the information using the second data when the speed of the vehicle and the fix quality of the GPS module are higher than predetermined reference values.

16. The location information system according to claim 14, wherein the smart device performs the updating of the information using the first data when the speed of the vehicle and the fix quality of the GPS module are lower than predetermined reference values.

17. The location information system according to claim 13, wherein the smart device compares the first data with the second data based on at least one of a speed of the vehicle and a fix quality of the GPS module.

18. The location information system according to claim 10, wherein the vehicle acquires the first data using angular velocity information acquired from a steering system of the vehicle and acceleration information acquired from a vehicle speed sensor of the vehicle.

* * * * *